April 5, 1932.  G. T. PFLEGER  1,852,476
INCLOSED CONVERTIBLE MOTOR
Filed March 6, 1928  2 Sheets-Sheet 1

INVENTOR:
George T. Pfleger,
By
ATTORNEY.

April 5, 1932.    G. T. PFLEGER    1,852,476
INCLOSED CONVERTIBLE MOTOR
Filed March 6, 1928    2 Sheets-Sheet 2

INVENTOR:
George T. Pfleger,
BY
ATTORNEY.

Patented Apr. 5, 1932								1,852,476

UNITED STATES PATENT OFFICE

GEORGE T. PFLEGER, OF LOS ANGELES, CALIFORNIA, ASSIGNOR TO UNITED STATES ELECTRICAL MANUFACTURING COMPANY, OF LOS ANGELES, CALIFORNIA, A CORPORATION OF CALIFORNIA

INCLOSED CONVERTIBLE MOTOR

Application filed March 6, 1928. Serial No. 259,410.

My invention relates to motors, and more particularly to an air-cooled inclosed motor.

It is often necessary to operate electric motors in an atmosphere containing foreign substances such as dust, moisture, or other substances which are injurious to the working parts or windings of the motor. One method of keeping such foreign substances from the interior of the motor is to totally inclose the motor, the cooling of the motor being accomplished by conducting the heat from the motor through the members inclosing the motor.

It is an object of my invention to provide a motor which is totally inclosed and which is cooled by a removal of heat through the inclosing members.

These inclosing members are formed of thin material having a high heat conductivity. One of these members is positioned on each end of the stator of the motor. In cooling the motor, I prefer to form an external circulating path for forcing air adjacent the exterior of the inclosing members. A similar internal circulation path is set up inside the motor adjacent the inclosing members so that heat may be transferred from the inner circulation path to the external circulation path through the inclosing members.

It is an object of my invention to provide an inclosed motor having a superior cooling action.

I accomplish this highly efficient cooling action by forming the inclosing members so that they conform in contour to the windings of the motor, and so that a certain turbulent action takes place in the air or other cooling medium passing over these members.

It is a further object of my invention to provide an inclosed motor having inclosing members which conform in shape to the windings of the motor, these members having irregular outlines whereby air or cooling medium passing thereadjacent will have a scouring action on the surface of the inclosing members.

It is a further object of my invention to provide internal and external circulation paths on opposite sides of the inclosing members.

Most motor manufacturers manufacture a number of lines of motors, and it is highly desirable that certain parts of the motors be interchangeable on different lines and types of motors. I have invented a motor which may be totally inclosed, pipe cooled, self-ventilated, or used as a standard open motor, depending upon the attachments utilized and whether or not inclosing members are utilized.

It is an object of my invention to provide a motor adapted to be either totally inclosed, pipe ventilated, self-ventilated, or a standard open motor, depending upon the attachment thereto or detachment therefrom of auxiliary apparatus adapted to be secured to the motor.

It is also desirable to form an inclosed motor in which the rotor may be easily removed therefrom without the trouble of disassembling the whole motor or removing the bearings from the shaft.

It is further desirable to be able to remove the rotor from either end of the motor without removing either bearing from the shaft.

It is a further object of my invention to provide an inclosed motor which is easily assembled and dismantled and which is easy to repair.

Further objects and advantages of my invention will be made evident hereinafter.

Referring to the drawings in which I illustrate a preferred embodiment of my invention,—

Figure 1:
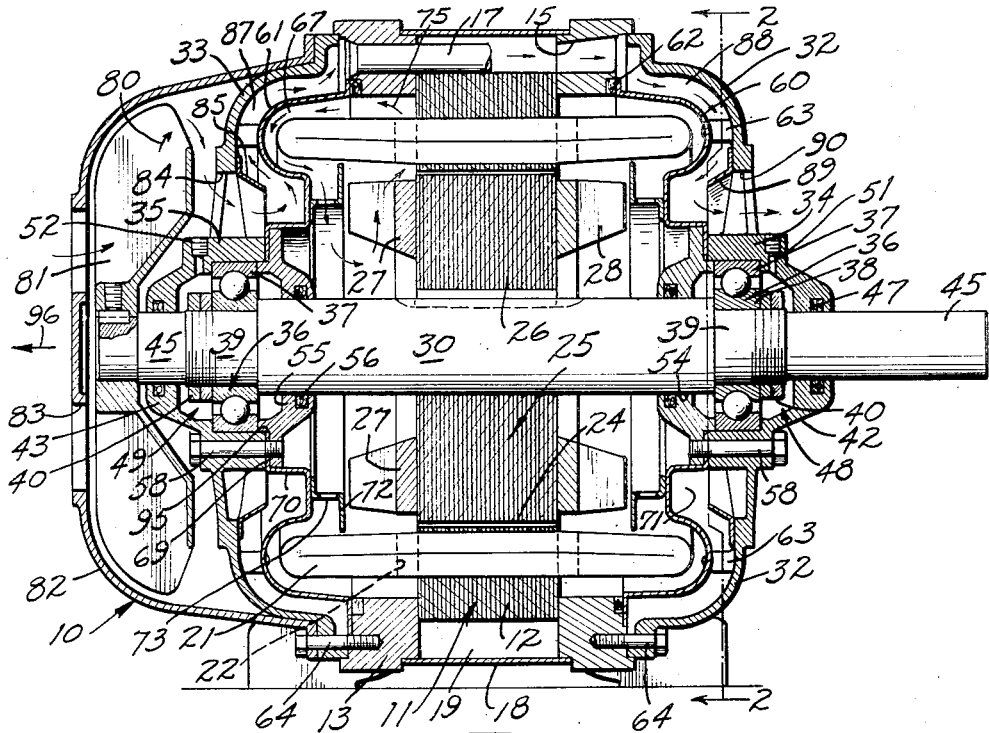
Fig. 1 is a vertical sectional view taken through the inclosed motor of my invention.
Figure 2:
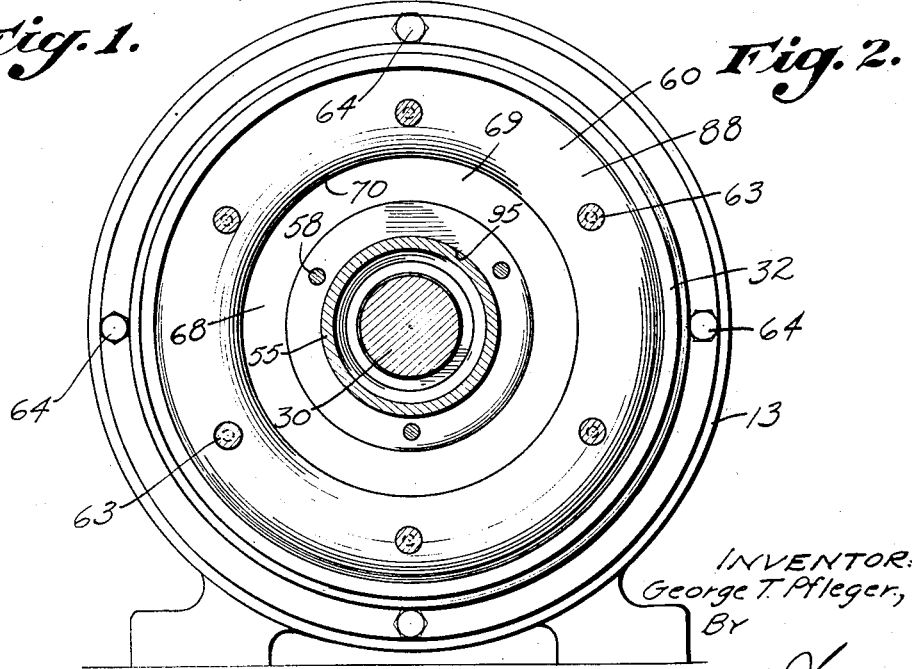
Fig. 2 is a sectional view taken on the line 2—2 of Fig. 1.

Referring in particular to Fig. 1, the motor 10 of my invention has a stator 11 having laminations or punchings 12 formed of suitable steel. Stator rings 13 are adapted to hold the punchings 12 in place, these stator rings having openings 15 therethrough. Alternate openings 15 are adapted to receive rivets 17 which suitably clamp the punchings 12 between the stator rings 13. A shell 18 extends between the stator rings 13, there being a chamber 19 between this shell and the periphery of the stator punchings 12. Thus, the openings 15 which do not receive rivets 17 communicate between the chamber 19 and the outer ends of the stator 11. Suitable windings 21 are placed on the stator 12, there being ventilating openings 22 between the windings and the punchings 12.

Extending in an opening or rotor space 24 in the stator 11 is a rotor 25 which may be of conventional design. In the rotor shown, laminations 26 are cast in a frame 27 of the rotor, this frame having ventilating blades 28 extending therefrom for the purpose of cooling the motor. The rotor 25 is suitably keyed to a shaft 30, this shaft being suitably journalled in front and rear end-bells 32 and 33. This journalling action takes place in front and rear bearing containers 34 and 35 in which bearings 36 are adapted to engage the inner walls of these bearing containers and the shaft 30. The bearings 36 are of the ball type and have outer races 37 forming a loose fit with the interior of the bearing containers 34 and 35. Inner races 38 of each bearing 36 are adapted to tightly engage a reduced diameter portion 39 of the shaft 30, these inner races being preferably pressed on the shaft 30. Nuts 40 threaded on the reduced diameter portion insure that the shaft 30 will not move axially relative to the bearings 36.

The outer ends of the bearing containers 34 and 35 are closed by covers 42 and 43 respectively, these covers being formed integrally with the end-bells and surround end portions 45 of the shaft 30. Suitable packing members 47 are placed between each cover and its respective end portion 45. These packing members are preferably formed of felt or other similar material, and are adapted to prevent any dust from entering bearing chambers 48 and 49 formed respectively by the bearing containers 34 and 35. Openings 51 closed by suitable plugs 52 are adapted to supply suitable lubricant to the bearing chambers 48 and 49.

Adapted to close the inner ends of the front and rear bearing containers 34 and 35 respectively are inner covers 54 and 55. These covers have suitable packing members 56 engaging the periphery of the shaft 30, these packing members being similar to the packing members 47 both in structure and in use. The inner covers are adapted to be clamped to their respective end-bells by means of bolts 58. I prefer to use three bolts 58 in each end-bell.

Adapted to be clamped between each inner cover and its respective bearing container are front and rear inclosing members 60 and 61, these inclosing members extending outward and bearing against suitable seat members 62 secured in the stator rings 13. These inclosing members are preferably formed of a thin material having a high heat conductivity. The inclosing members 60 and 61 are secured to projections 63 formed on front and rear end-bells 32 and 33 so that the inclosing members may be removed with the end-bells when bolts 64 securing the end-bells to the stator rings 13 are moved.

The inclosing members 60 and 61 are formed in a shape indicated best in Fig. 1 so as to conform in contour to the opposite ends of the windings 21 of the stator and to extend on three sides thereof to form a channel 67 therebetween. Each inclosing member has radial portions 68 and 69, the portion 69 being clamped between the inner covers and their respective bearing containers. A cylindrical wall 70 joins the radial portions 68 and 69 and cooperates with that portion of the inclosing member which defines the channels 67 in forming a trough 71. Secured to the inner face of each radial portion 68 is a baffle 72 which is concentric with the axis of the shaft 30 and which has openings 73 extending therethrough. The outer ends of the baffle 72 extend close to the inner surface of the windings 21, as best shown in Fig. 1.

This baffle is adapted to direct the flow of air or other cooling medium through an internal circulation path indicated by arrows 75. As the rotor 25 turns, the blades 28 thereon cause the air to be thrown outward and through the openings 22 formed in the stator windings, this air then flowing toward the end of the motor and passing through the channel 67 formed between the inclosing members and the windings 21. This flow of cooling medium is turned by the baffle 72 through the openings 73 and again reaches the rotor near the central portion thereof. This air is warmed due to the heat generated in the windings 22 and in the rotor 25, and also due to the hysteresis and eddy current losses in the stator and rotor.

As this warmed air passes adjacent the inclosing members, a portion of this heat is transferred to these members, and passes therethrough. This heat is transmitted to a cooling medium passing through an external circulation path indicated by arrows 80. This cooling medium may conveniently be air, this air being propelled by a suitable fan 81 secured to the rear end of the shaft 30 outside the end-bell 33. A suitable fan cover 82 surrounds this fan and is clamped to the stator by the bolts 64. This fan cover has openings 83 therein which conduct air to the fan 81, this air being forced outward as indicated by the arrows 80. This outward flow is reversed when the air leaves the fan, the air passing inward through openings 84 formed in the rear end-bell. A suitable baffle 85 directs this flow toward the central part of the motor so that the air will pass adjacent the walls of the trough 71 in such a manner that turbulent action will be set up in the air stream so as to cause a scouring action of the air on the inclosing member 61. The air then passes outward through a channel 87 between the end-bell 33 and the inclosing member 61. The air is transferred to and from the chamber 19 through the alternate openings 15, as previously described, this air then passing through a channel 88 defined between the enclosing member 60 and the end-bell 32. A baffle 89 similar to the baffle 85 directs this flow of air adjacent the enclosing member 60 and outward through openings 90 formed in the end-bell 32.

It should be apparent that the circulating paths indicated by the arrows 75 and 80 are directed in opposite directions relative to the inclosing members. This is of a very material advantage, inasmuch as the heat passing through these inclosing members is directly proportional to the difference in temperature maintained between the inner and outer surfaces thereof. The air passing through the openings 84, for instance, is gradually warmed as it passes through the channel 87, and the air passing through the channel 67 is gradually cooled, thus effecting a maximum difference in temperature between the inner and outer surfaces of the inclosing members throughout the distance the circulating air contacts therewith.

It is especially desirable that the rotor 25 be removable from the motor 10 without completely disassembling the motor. I accomplish this result by spacing an innermost edge 95 of each inclosing member a distance from the shaft. This innermost edge is formed of equal, or slightly larger, diameter than the outer races 37 of the bearings 36. Thus, when it is desired to remove the rotor from the motor, it is only necessary to remove the four bolts indicated by the numeral 64 and withdraw the three bolts 58 extending through the front end-bell 32 a sufficient distance so that the inner cover 54 is released. At this time the structure comprising the fan cover 82, the end-bell 33 and its attached inclosing member 61, and the shaft 30 with its attached fan and rotor, may be pulled in a direction indicated by the arrow 96. As this is done, the outer race 37 of the front bearing 36 slides in the bearing container 34 pushing the inner cover 54 therewith. This inner cover does not bind against the walls of the inclosing member, and the outer race 37 easily passes the innermost edge 95 of the inclosing member 60. The rear bearing in the bearing chamber 49 need not be disturbed in this operation of removing the rotor. This comparatively easy means of assembling and disassembling the motor is especially advantageous in repair and manufacturing operations.

Figure 3:
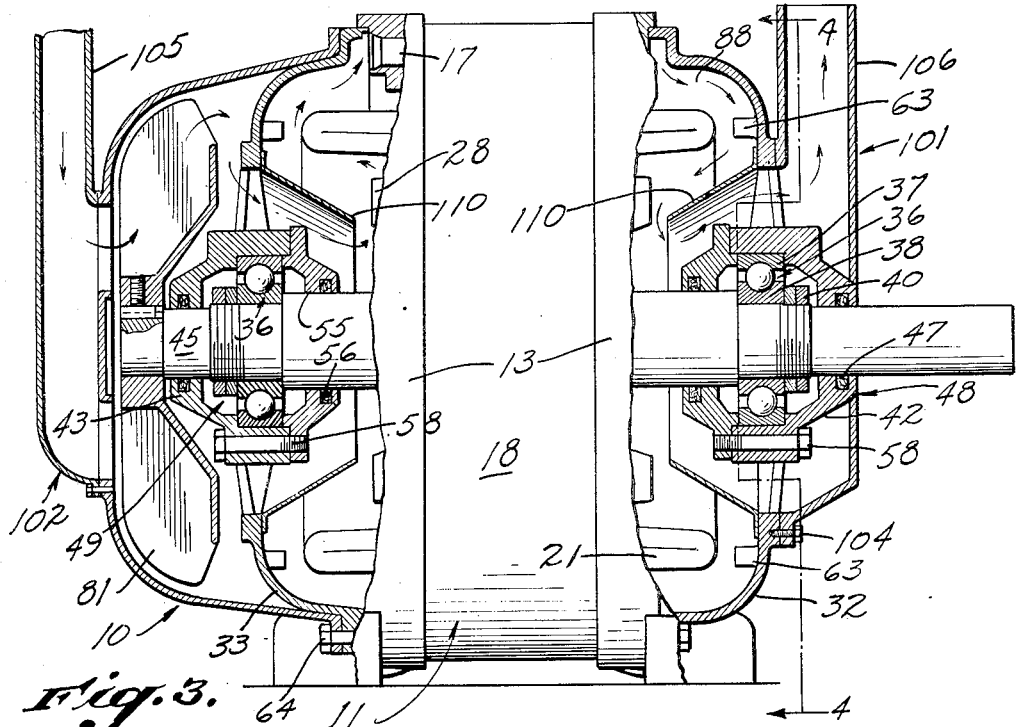
Fig. 3 is a view similar to Fig. 1 showing the motor of my invention adapted to be pipe cooled.
Figure 4:
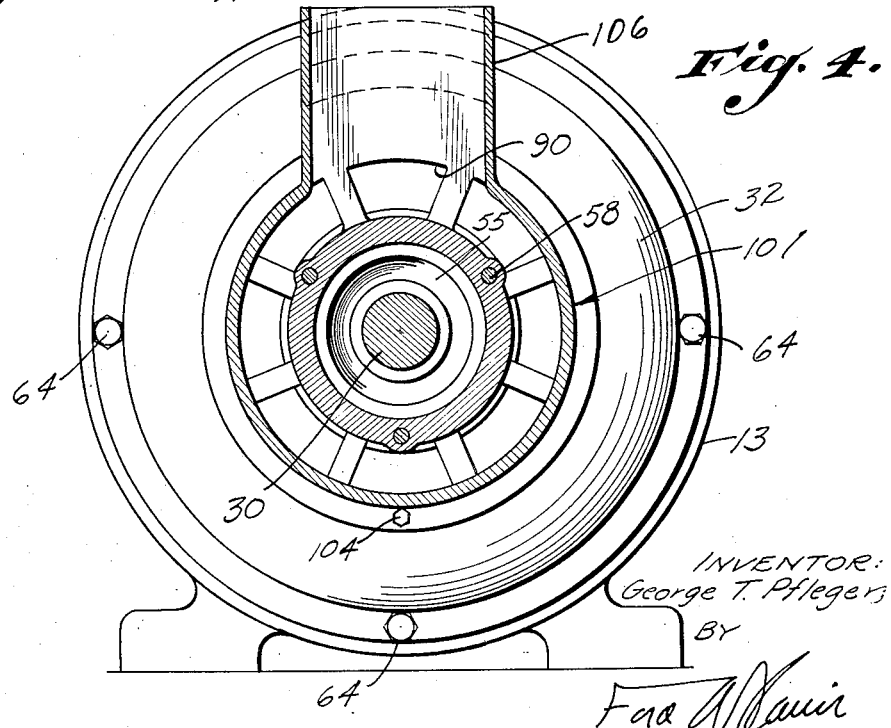
Fig. 4 is a sectional view taken on the line 4—4 of Fig. 3.

Another very decided advantage of the motor of my invention is that the standard stator, rotor, end-bells, and bearings may be used on different types of motor. Thus, it is often desirable to supply a motor with clean air often derived from points above the roof of a factory and transmitted to the motor through suitable pipes. My motor is readily adapted to this use by attaching front and rear pipe ventilating members 101 and 102 respectively to the front end-bell 32 and the fan cover 82 by cap screws 104 as shown in Figs. 3 and 4. Intake and exhaust pipes 105 and 106 communicate with pipe members 101 and 102 respectively. The motor shown in Fig. 3 utilizes the fan 81 for drawing air through the intake pipe 105 and forcing it out the exhaust pipe 106. In the form shown the inclosing members have been removed inasmuch as it is assumed that the intake pipe receives a supply of clean air non-injurious to the motor. It is also entirely possible to utilize the inclosing members if this supply of air is not clean or if it is injurious to the motor.

If the inclosing members are not used, I find that a better cooling action is obtained by installing a baffle 110 which extends inward toward the rotor a greater distance than the baffle 85 shown in Fig. 1. The fan 81 and its cover 82 may also be eliminated and the blades 28 of the rotor used as an air circulating medium. In the latter case the rear pipe ventilating member 102 will be designed to fit directly on the rear end-bell 33.

Furthermore, the pipe ventilating member 101 may be entirely dispensed with, and the motor operated as a self-cooled motor either with or without the inclosing members 60 and 61. This flexibility of manufacture is extremely desirable and is an important part of the invention.

I claim as my invention:

1. In a dynamo-electric machine, the combination of: a stator structure comprising a pair of end rings and a series of laminations therebetween, said end rings providing openings therethrough; means extending between said end rings and defining a chamber around said laminations; means passing through certain of said openings and through said chamber for clamping said end rings against said laminations; and means for circulating a cooling medium through said chamber and through the other of said openings.

2. In a dynamo-electric machine, the combination of: a stator structure comprising a pair of end rings and a series of laminations therebetween, said end rings providing openings therethrough lying entirely outside of said laminations; means passing through certain of said openings for clamping said laminations between said end rings; a rotor rotatably mounted relative to said stator structure, said last mentioned openings being equidistant from the axis of rotation of said rotor; and means for forcing a cooling medium through the other of said openings.

3. In a dynamo-electric machine, the combination of: a stator structure comprising end rings and a series of laminations therebetween, said end rings providing openings therethrough lying entirely outside of said laminations; means extending through certain of said openings for clamping said laminations between said rings; a rotor rotatably mounted relative to said stator structure, said last mentioned openings being equidistant from the axis of rotation of said rotor; inclosing members inclosing each end of said dynamo-electric machine and extending outwardly to contact said stator structure adjacent said openings; and means for circulating a cooling medium around the outer surfaces of said inclosing members and through the other of said openings.

4. In a dynamo-electric machine, the combination of: a stator structure comprising a pair of end rings and a series of laminations therebetween, said end rings providing openings therethrough; a shell extending between said end rings and defining a chamber around said laminations; a rotor rotatably mounted in said stator structure; means engaging said end rings and defining a chamber at each end of said dynamo-electric machine, said chambers providing a continuous passage around said stator structure and rotor; means passing through certain of said ring openings and said first mentioned chamber for clamping said end rings against said laminations; and means for circulating a cooling medium through said passage.

5. In a dynamo-electric machine, the combination of: a stator structure comprising a pair of end rings and a series of laminations therebetween, said end rings providing openings lying entirely outside of said laminations; a winding on said stator structure; a rotor rotatably mounted in said stator structure; means extending between said end rings and defining a chamber around said laminations; an inclosing member at each end of said dynamo-electric machine and defining chambers communicating with said first mentioned chamber; means passing through certain of said ring openings and said first mentioned chamber for clamping said end rings against said laminations; and means for circulating a cooling medium through said chambers.

6. In a dynamo-electric machine, the combination of: a stator structure comprising a pair of end rings and a series of laminations therebetween, said end rings providing openings therethrough; a winding on said stator structure; a rotor rotatably mounted in said stator structure; a shell extending between said end rings and defining a chamber around said laminations; inclosing members inclosing the ends of said rotor and stator structure and defining passages therearound, said passages communicating with said chamber; means passing through certain of said ring openings and said chamber for clamping said rings against said laminations; and means for circulating a cooling medium through said passages and chamber.

7. A combination as defined in claim 6 including means for setting up a circulation inside of said inclosing members.

8. A combination as defined in claim 6 in which said openings are equidistant from the axis of rotation of said rotor and lie entirely outside of said laminations.

9. In a dynamo-electric machine, the combination of: a stator structure comprising a pair of end rings and a series of laminations therebetween, said end rings providing openings therethrough; a winding on said stator structure; a rotor rotatably mounted relative to said stator structure; a shell connecting said end rings and forming a chamber around said laminations, said ring openings communicating with said chamber; means passing through certain of said openings and said chamber for clamping said end rings to said stator structure; heat conductive inclosing members inclosing the ends of said dynamo-electric machine, said members extending around the end turns of said winding and forming passages communicating with said chamber; means for circulating a cooling medium through said passages in one direction against the exterior surfaces of said inclosing members in a manner to exert a scouring action thereon; and means for setting up a circulation of heated medium inside of said inclosing members, said heated medium being circulated in a direction opposite to that of said cooling medium and engaging the inner surfaces of said inclosing members in a manner to be cooled.

In testimony whereof, I have hereunto set my hand at Los Angeles, California, this 28th day of February, 1928.

GEORGE T. PFLEGER.